Jan. 19, 1965   I. T. BROWN ETAL   3,165,953
DEVICE FOR CUTTING AND SUPPLYING FILTER PLUGS
Filed July 18, 1962   2 Sheets-Sheet 2
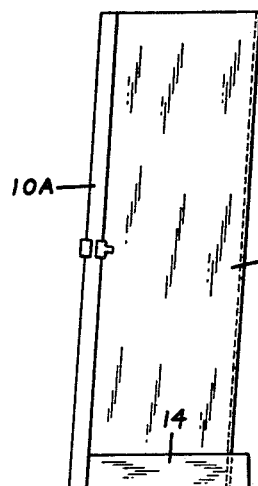
FIG. 2.
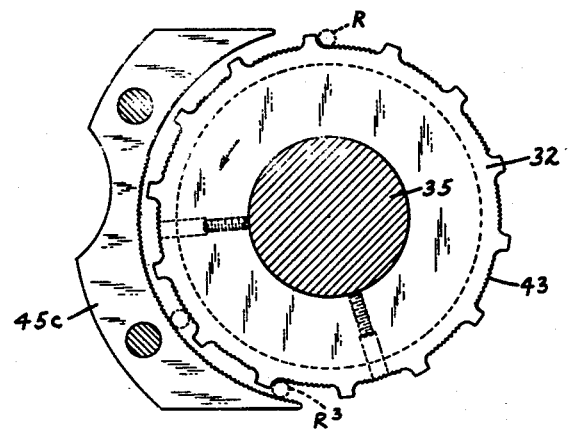
FIG. 3.
FIG. 4.
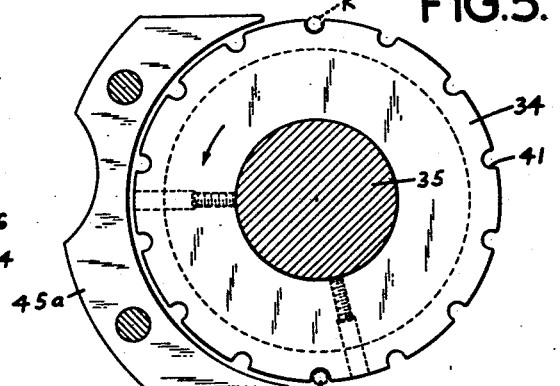
FIG. 5.
INVENTORS:
ISAAC T. BROWN
HERBERT F. ADEBAHR
BY
THEIR ATTORNEYS

United States Patent Office 3,165,953
Patented Jan. 19, 1965

3,165,953
DEVICE FOR CUTTING AND SUPPLYING
FILTER PLUGS
Isaac T. Brown, Gibsonville, and Herbert F. Adebahr, Greensboro, N.C., assignors to P. Lorillard Company, New York, N.Y., a corporation of New Jersey
Filed July 18, 1962, Ser. No. 210,804
13 Claims. (Cl. 83—102)

This invention relates to the manufacture of tobacco products and more particularly to an apparatus for cutting filter material for the manufacture of filter tip cigarettes.

The material from which the filters for filter tip cigarettes are made usually is supplied in rods having a length equal to a plurality of filter tips. Customarily the filter tip material, which may be of a fibrous nature or the like, is provided with a tubular wrapper of suitable diameter for attachment to the end of a cigarette. The rods of filter material are supplied to a cutting apparatus where the rods are cut into three sections, each of which is equal in length to two filter tips for cigarettes. The dual filter tips are fed into a drum-like mechanism which by means of a complicated system of planetary gearing shifts sections of the drum so that the three dual filter tips are moved out of alignment into a staggered parallel relation. Thereafter, by means of plungers mounted on the drums, the dual filter tips are shifted endwise into a column in parallel relation. Each dual filter tip is then fed into an assembling drum where it is interposed between a pair of cigarettes in endwise alignment. Thereafter, the assembled cigarettes and filter elements are transferred to a wrapping mechanism where a strip of paper is wrapped around and adhered to the ends of the cigarettes and the interposed dual filter tip to secure the filter to the adjacent ends of the two cigarettes. Thereafter, the cigarettes and the interposed dual filer tip are moved past a cutter which cuts the filter tip transversely thereby providing two cigarettes each having a filter tip. By means of a suitable transfer and turnover device one of each pair of cigarettes is turned over to face the filter tips of all of the cigarettes in the same direction.

The mechanisms for cutting and moving the cigarette filter sections into offset relation and into a column are complex and require precise adjustment in order to assure proper cutting and positioning of the dual filter tips.

In accordance with the present invention, a novel and simplified mechanism is provided for cutting and positioning dual filter tip elements so that they can be positioned accurately for insertion between a pair of cigarettes.

More particularly, the new cutting and positioning device includes a drum member having a plurality of drum elements therein provided with grooves around their peripheries for receiving a rod of filter material, transporting it past a cutter where it is cut into a plurality of dual filter tips and then causing two of the three cut sections of the filter rod to be displaced along the grooves in all but one of the drum elements through different distances to dispose them in staggered relation or echelon. Mechanism is provided for receiving the dual filter tips in their staggered relation and moving them past a fixed cam mechanism which pushes the dual filter tips endwise to form a column to be interposed between the ends of a pair of cigarettes.

The preferred cutting and positioning mechanism comprises only a few simple moving parts which after initial adjustment require no further attention and little servicing in order to function effectively to properly cut and move the cut sections of the filter rod into a column of parallel sections. However, the mechanism is readily adjustable to accommodate filter tip rods of different lengths and to form filter tips of different lengths therefrom.

For a better understanding of the present invention reference may be had to the accompanying drawing in which:

FIG. 2 is an end elevational view of the apparatus;

FIG. 3 is a side elevational view of one of the drum sections of the aligning apparatus;

FIG. 4 is an end elevational view of another drum section of the aligning apparatus, and FIG. 5 is an end elevational view of a third drum section of the apparatus.

Figure 1:
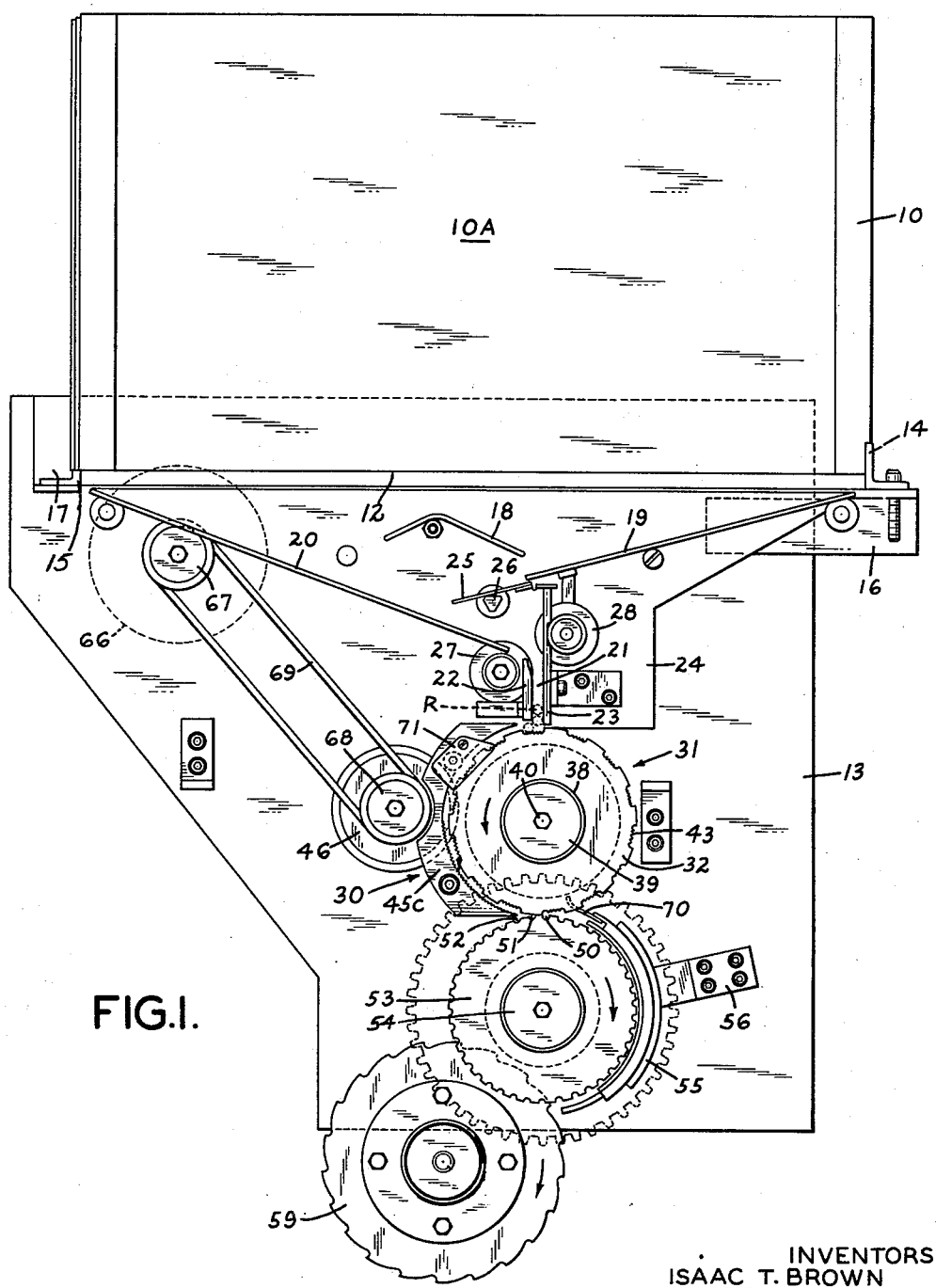
FIG. 1 is a side elevational view of a typical cutting and positioning apparatus embodying the present invention.

The invention will be described with reference to a device which is used for cutting three dual filter tip sections from filter rods and then shifting them into a column. It will be understood, of course, that the apparatus can be modified to cut two or four or more dual filter tip sections from filter rods by multiplication or reduction of the number of parts of the apparatus to be described herein.

Referring to FIGS. 1 and 2, the cigarette filter rods R are packed in a magazine 10 with the filter rods R extending transversely of the magazine. The magazine may be in the form of a metal box having a lid 10A to enable it to be filled and having one side 12 thereof open or removable so that the filter rods R can be discharged therefrom. The magazine 10 is received on top of a frame plate 13 and is supported by means of the flanges 14 and 15 extending outwardly therefrom and supported on suitable brackets 16 and 17. Directly below the magazine 10 are a series of inclined baffle plates 18, 19 and 20 which converge downwardly to feed the filter rods in succession into a substantially vertical throat 21 between a pair of parallel plates 22 and 23 which extend outwardly from a subframe plate 24 mounted on a frame plate 11. In order to assure feeding of the rods, a hinged baffle 25 is mounted above the throat and is oscillated up and down by means of a three lobe cam 26 which is rotatably mounted in the subframe 24 and driven by means to be described. Also, a pair of knurled rollers 27 and 28 extend through the guide plates 22 and 23 and are rotated in directions counter to the downward movement of the rods so that only one rod R at a time is fed downwardly between the plates thereby preventing the rods from blocking the throat 21.

Directly below the lower end of the throat 21 is a mechanism 30 embodying the invention by means of which the filter rods R are cut into three sections and the sections are shifted into offset or staggered relation. As shown in FIGS. 2 to 5, one element of the cutting and shifting mechanism includes a drum 31 which, as illustrated, is composed of three disk-like elements or disks 32, 33 and 34, all of which are fixed to a shaft 35 which is rotatably mounted in the frame plate 11. As shown in FIGS. 3, 4 and 5, each of the disks 32, 33 and 34 is provided with drilled and threaded bores 36 and 37 for receiving set screws for securing the disks to the shaft 35. Further, they are clamped by means of a clamping plate 38, a washer 39 and a screw 40 wrich is screwed into the end of the shaft 35. Also, the disks 32, 33 and 34 may be spaced apart by means of shims or the like which are replaceable with other wider or narrower shims in order to vary the axial spacing of the disks.

As best shown in FIGS. 3, 4, and 5, each of the disks has an equal number of notches 41, 42 and 43 therein. Each notch 41 in the disk 34 is about the same diameter as the diameter of a filter rod R to be received therein.

Each notch 42 in the disk 33 is slightly more than twice as long as the diameter of a cigarette rod R.

Each notch 43 in the disk 32 is slightly more than three times as long as the diameter of a filter rod R. The depths of the notches are slightly greater than the radius of a rod R so that the outer peripheries of the rods R received in the notches in the disks project beyond the peripheries of the disks. As shown in FIGS. 3, 4 and 5, when a rod R enters the drum 31, one end portion of it will be received in the groove 41, its mid portion in a groove 42 and the opposite end portion in a groove 43, in each case, bearing against one end of the groove.

As shown in FIG. 1 the drum 31 is rotated in a counterclockwise direction, so that the periphery of the drum moves by arcuate contact or friction bars 45a, 45b and 45c. The friction bars extend around the periphery of the drum 31 from about the throat 21 to a point slightly short of diametrically opposite therefrom. The bars are arranged to engage the outer surface of the cigarette rod R with light frictional engagement so that the cigarette rod R disposed in the corresponding grooves 41, 42 and 43 tends to rotate in the grooves and to be turned in a clockwise direction by engagement with the bars. The bars 45b and 45c overlying the disks 32 and 33 may be slightly knurled as may be the bottoms of the grooves 42 and 43. Bar 45a serves mainly to retain the filter sections in the grooves 41 of the disk 34 and has a smooth surface opposing the disk. As the rods are moved with the drum 31 in a counterclockwise direction, they are carried into engagement with a pair of parallel rotating disk cutters 46, only one of which is shown, which have their edges extending into the grooves 47 and 48 between the disks 32, 33 and 34 as shown in FIG. 2. In this way, the filter rod R is cut into three sections and due to engagement of these sections with the arcuate bars 45b and 45c, the sections in the notches 42 and 43 are rolled toward the rear ends of the notches as shown in dotted lines in these figures. The cut dual filter tip section of the rod R in each groove of the disk 34 cannot roll but it may rotate slightly in the groove thereby rounding and shaping it. As a result of the rolling movement of the filter tip sections in the disks 32 and 33, they will be disposed against the trailing edges of the notches 42 and 43 and in staggered relation as shown in FIGS. 3, 4, and 5 when they reach a position corresponding to the bottom of the drum 31 as shown in FIG. 1.

The staggered filter tip sections are transferred into successive grooves 50, 51 and 52 of a transfer and shifting drum 53 which is mounted directly below the drum 31 and is supported for rotation on a shaft 54 mounted in the frame plate 11.

Referring now to FIG. 2, the dual filter tip sections identified as R1, R2 and R3 are received in the grooves of the drum 53 as described above but are in offset, staggered relation. In order to move them into a column for introduction between pairs of cigarettes, a cam plate 55 is mounted on a bracket 56 carried by the frame plate 11 and overlying the surface of the drum 53. The cam plate has a pair of members provided with inwardly and downwardly conveying edges 56 and 57 thereon which engage an outer end of each of the sections R1 and R3 and push them endwise into a column, one behind the other, and in parallel relation for transfer into an assembly drum 59 where a pair of cigarettes are introduced at opposite ends of each of the sections R1, R2 and R3. In this way by the use of only two rotating drums 31 and 53 in combination with the fixed arcuate elements 45a, 45b and 45c and the fixed cam plate 55, the filter rods can be cut into sections, the sections moved into offset relation and then rearranged in a column of parallel filter sections R1 to R3. All of these operations can be properly accomplished by means of a gear train including the main drive gear 60 which is fixed to the drum 53 and meshes with a gear 61 fixed to the drum 31. Rollers 27 and 28 are driven by means of a gear train 62, 63, 64 and 65.

The gear 64 is connected to the roller 28 and the gear 65 is connected to and drives the cam 26. Other gears (not shown) corresponding to gears 62 and 63 drive the roller 27.

A separate motor 66 may be provided for driving the cutters 46 by means of suitable pulleys 67 and 68 and a belt 69. Accordingly, when the elements are properly adjusted, no further adjustment is necessary to assure proper operation of the apparatus in cutting the filter rods into an appropriate number of sections of dual filter tips.

It should be understood that the apparatus is susceptible to considerable modification, as indicated above, insofar as the number of sections into which the rods are to be cut by appropriately varying the number of the disks for receiving the rods and transporting and shifting the cut sections, in the gear train or mechanism for driving the drum 31 and in the arrangement of the arcuate rolling bars 45a to 45c to achieve the desired displacement of the cut filter sections. Moreover, the apparatus may be provided with suitable wires or fingers 70 wherever required for assuring the discharge of the cut filter sections from the several drum disks. Guide plates 71 and 72 are mounted on the bars 45c and 45a at opposite ends of the drum 31 for properly positioning the filter rods R lengthwise of the grooves in drum 31. Moreover, the bars 45a to 45c may be shifted to correspond to changed spacing between the disks 32, 33 and 34 to accommodate filter rods of different lengths and enable them to be divided into sections of equal length. Other modifications may be made as desired or appropriate. Accordingly, the form of the invention described herein should be considered illustrative and the invention should be considered as limited only as defined in the following claims.

We claim:

1. Apparatus for dividing filter tip rods into sections of equal length and arranging said sections in echelon comprising a first member for receiving a substantially cylindrical rod of filter tip material equal in length to a plurality of filter tips, a second member adjacent to said first member and frictionally engageable with said rod, means for cutting said rod into sections of substantially equal length and means for moving said first and second members relatively to roll said sections on said first member unequal distances and displace them into staggered relation to each other and to said first member.

2. The apparatus set forth in claim 1 in which said first member comprises a plurality of disk-like members each having at least one peripheral groove therein for receiving said rod, the groove in at least one of said disk-like members being of greater extent circumferentially thereof than the groove in another of said disk-like members and said groove in said one of said disk-like members having an end in alignment with an end of said groove in said another of said disk-like members.

3. The apparatus set forth in claim 2 in which said disk-like members are rotatable in unison relative to said second member.

4. The apparatus set forth in claim 1 in which said first member comprises a plurality of coaxial rotatable disk-like members, each having an equal number of peripheral grooves parallel with the axis thereof, the grooves in one of said disk-like members being substantially complemental to said rod, and the grooves in each of the other disk-like members being of greater circumferential extent than the grooves in said one disk-like member and the circumferential extents of the grooves in said other disk-like members being different.

5. The apparatus set forth in claim 1 in which said first member is rotatable and said second member comprises a plurality of elements having arcuate surfaces opposing said first member and engaging said sections.

6. Apparatus for dividing filter tip rods into sections of equal length and arranging said sections in parallel relation in a column comprising a first member for receiving a substantially cylindrical rod of filter tip material equal in length to a plurality of filter tips, a second member adjacent to said first member and frictionally engageable with said rod, means for cutting said rod into sections of substantially equal length, means for moving said first and second members relatively to roll said sections unequal distances relative to said first member and displace them into staggered relation, a movable member for receiving said sections in their staggered relation and a fixed member opposing said movable member and engageable with an end of at least one of said sections and moving it endwise to dispose said sections in parallel relation in a column.

7. The apparatus set forth in claim 6 in which said movable member comprises a drum having peripheral grooves substantially parallel to the axis of said drum, each groove receiving a different section.

8. The apparatus set forth in claim 7 in which said fixed member has at least one inclined cam surface thereon engageable with said one end of said sections.

9. The apparatus set forth in claim 6 in which said first member comprises a plurality of disk-like members having equal numbers of corresponding peripheral grooves therein for receiving said rods, the grooves in at least one of said disk-like members being of greater extent circumferentially thereof than the corresponding grooves in another of said disk-like members.

10. The apparatus set forth in claim 9 in which said disk-like members are rotatable in unison relative to said second member.

11. The apparatus set forth in claim 6 in which said first member comprises a plurality of coaxial rotatable disk-like members, each having an equal number of corresponding peripheral grooves parallel with the axis thereof, the grooves in one of said disk-like members being substantially complemental to said rod, and the corresponding grooves in each of the other disk-like members being of greater circumferential extent than the grooves in said one disk-like member and the circumferential extents of the corresponding grooves in said other disk-like members being different.

12. The apparatus set forth in claim 6 in which said first member is rotatable and said second member comprises a plurality of elements having arcuate surfaces opposing said first member and engaging said sections.

13. Apparatus for dividing filter tip rods into sections of equal length and arranging said sections in echelon comprising a first member having a plurality of grooves in a peripheral surface thereof, said grooves extending transversely of said member in end to end relation and being of different widths and substantially equal depths, means for introducing a substantially cylindrical filter rod into said grooves substantially lengthwise thereof and adjacent to one side thereof, a second member opposing said first member for engaging said rod frictionally, means for cutting said rod into a plurality of sections of substantially equal length, each section being disposed in a different groove and in end to end alignment, means for moving said first and second members relatively to roll at least one of said sections widthwise of a wider groove and displace it along said surface of said member and into a position parallel with and in staggered relation to another section of said rod in a narrower groove.

References Cited in the file of this patent
UNITED STATES PATENTS

| | | |
|---|---|---|
| 3,001,528 | Schubert | Sept. 26, 1961 |
| 3,010,561 | Riche | Nov. 28, 1961 |
| 3,036,581 | Dearsley | May 29, 1962 |
| 3,058,475 | Gamberini | Oct. 16, 1962 |